United States Patent
Bang et al.

(10) Patent No.: US 8,588,515 B2
(45) Date of Patent: Nov. 19, 2013

(54) METHOD AND APPARATUS FOR IMPROVING QUALITY OF DEPTH IMAGE

(75) Inventors: Gun Bang, Daejeon (KR); Gi-Mun Um, Daejeon (KR); Eun-Young Chang, Daejeon (KR); Taeone Kim, Daejeon (KR); Nam-Ho Hur, Daejeon (KR); Jin-Woong Kim, Daejeon (KR); Soo-In Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 397 days.

(21) Appl. No.: 12/695,287

(22) Filed: Jan. 28, 2010

(65) Prior Publication Data

US 2010/0195898 A1  Aug. 5, 2010

Related U.S. Application Data (60) Provisional application No. 61/147,807, filed on Jan. 28, 2009, provisional application No. 61/169,539, filed on Apr. 15, 2009.

(51) Int. Cl.
*G06K 9/00* (2006.01)

(52) U.S. Cl.
USPC ............................. 382/154; 382/106; 382/254

(58) Field of Classification Search
USPC .......................................... 382/106, 154, 254
See application file for complete search history.

(56) References Cited

U.S. PATENT DOCUMENTS

| | | | |
|---|---|---|---|
| 6,507,665 B1 * | 1/2003 | Cahill et al. | 382/154 |
| 7,043,074 B1 * | 5/2006 | Darbee | 382/154 |
| 8,019,146 B2 * | 9/2011 | Koo et al. | 382/154 |
| 2004/0189796 A1 | 9/2004 | Ho et al. | |
| 2004/0240725 A1 * | 12/2004 | Xu et al. | 382/154 |
| 2005/0190180 A1 * | 9/2005 | Jin et al. | 345/419 |
| 2005/0286756 A1 * | 12/2005 | Hong et al. | 382/154 |
| 2006/0120594 A1 * | 6/2006 | Kim et al. | 382/154 |

(Continued)

FOREIGN PATENT DOCUMENTS

| | | |
|---|---|---|
| JP | 2009-239903 A | 10/2009 |
| KR | 1020040084455 A | 10/2004 |

(Continued)

OTHER PUBLICATIONS

Gun Bang, et al; "The depth estimation to improve background", ETRI International Organisation for Standardisation Organisation Internationale De Normalisation ISO/IEC JTC1/SC29/WG11/M16070 Coding of Moving Pictures and Audio, Lausanne, Switzerland, Jan. 2009, 7 pages.

(Continued)

*Primary Examiner* — John Strege
(74) *Attorney, Agent, or Firm* — Ladas & Parry LLP (57) ABSTRACT

A method and apparatus for enhancing quality of a depth image are provided. A method for enhancing quality of a depth image includes: receiving a multi-view image including a left image, a right image, and a center image; receiving a current depth image frame and a previous depth image frame of the current depth image frame; setting an intensity difference value corresponding to a specific disparity value of the current depth image frame by using the current depth image frame and the previous depth image frame; setting a disparity value range including the specific disparity value; and setting an intensity difference value corresponding to the disparity value range of the current depth image frame by using the multi-viewpoint image.

14 Claims, 4 Drawing Sheets

(56) References Cited

U.S. PATENT DOCUMENTS

| | | | |
|---|---|---|---|
| 2007/0122028 A1* | 5/2007 | Sun et al. | 382/154 |
| 2007/0296721 A1* | 12/2007 | Chang et al. | 345/427 |
| 2009/0225183 A1 | 9/2009 | Tamura | |

FOREIGN PATENT DOCUMENTS

| | | |
|---|---|---|
| KR | 1020060063480 A | 6/2006 |
| KR | 1020080043576 A | 5/2008 |
| KR | 1020080051015 A | 6/2008 |
| KR | 1020090092839 A | 9/2009 |
| WO | 2008/075276 A1 | 6/2008 |

OTHER PUBLICATIONS

Gun Bang, et al; "Depth Estimation algorithm in SADERS1.0", ETRI International Organisation for Standardisation Organisation Internationale De Normalisation ISO/IEC JTC1/SC29/WG11 Coding of Moving Pictures and Audio, MPEG2009/m16411 Apr. 2009, Maui, USA, 8 pages.

* cited by examiner

METHOD AND APPARATUS FOR IMPROVING QUALITY OF DEPTH IMAGE

CROSS-REFERENCE(S) TO RELATED APPLICATIONS

The present application claims priority of U.S. Provisional Patent Application Nos. 61/147,807 and 61/169,539, filed on Jan. 28, 2009, and Apr. 15, 2009, which are incorporated herein by reference in its (their) entirety.

BACKGROUND OF THE INVENTION

1. Field of the Invention

Exemplary embodiments of the present invention relate to a method and apparatus for enhancing quality of a depth image; and, more particularly, to a method and apparatus for further enhancing quality of a depth image which has already been acquired.

2. Description of Related Art

As interest in three-dimensional (3D) images has increased in recent years, much research has been conducted on 3D image technologies. In order to render a 3D image, it is necessary to acquire 3D information or depth information of an object or scene.

Unlike a general video image, a depth image refers to an image which includes depth information of an object or scene from a camera. The depth information is represented with a value of 0 to 255. The value of 0 represents that an object or scene is located farthest from a camera, and the value of 255 represents that an object or scene is located closest to a camera.

A depth image may be acquired by two methods. A first method is an active method which acquires a depth image by using an active 3D information acquisition apparatus. A second method is a passive method which acquires a depth image by using a correlation between images acquired from a multi-view camera at the same time. A representative example of the passive method is a stereo matching.

A representative example of the active method is a Time-Of-Flight (TOF) method. In the case of the TOF method, a non-visible light is irradiated on an object, and the time taken for the irradiated light to return back from the object is measured. Then, a depth image is created by calculating a distance from a camera to the object by using the measured time. Although the TOF method can create a depth image in real time, it is difficult to acquire a high-quality depth image due to irregular reflection or noise which occurs in bright environments.

In the case of the passive method, the correlation of the respective points of view is calculated from multi-view images acquired through a multi-view camera by using software, and a depth value is obtained by calculating a disparity value between the points of view through the calculated correlation. Since the passive method calculates the depth value by using only several limited components, it is likely to acquire depth information different from the real depth information.

SUMMARY OF THE INVENTION

An embodiment of the present invention is directed to a method and apparatus for enhancing quality of a depth image, which are capable of enhancing quality of a depth image acquired using an active or passive method by more exactly setting a disparity value and an intensity difference value included in the depth image.

Another embodiment of the present invention is directed to a method and apparatus for enhancing quality of a depth image, which are capable of enhancing quality of a depth image acquired using an active or passive method, removing noise from the depth image, and enhancing temporal consistency of the depth image.

In accordance with an embodiment of the present invention, a method for enhancing quality of a depth image includes: receiving a multi-view image including a left image, a right image, and a center image; receiving a current depth image frame and a previous depth image frame of the current depth image frame; setting an intensity difference value corresponding to a specific disparity value of the current depth image frame by using the current depth image frame and the previous depth image frame; setting a disparity value range including the specific disparity value; and setting an intensity difference value corresponding to the disparity value range of the current depth image frame by using the multi-view image.

In accordance with another embodiment of the present invention, an apparatus for enhancing quality of a depth image includes: an input unit configured to receive a multi-view image, which includes a left image, a right image, and a center image, a current depth image frame, and a previous depth image frame of the current depth image frame; a first processing unit configured to set an intensity difference value corresponding to a specific disparity value of the current depth image frame by using the current depth image frame and the previous depth image frame; and a second processing unit configured to set a disparity value range including the specific disparity value, and set an intensity difference value corresponding to the disparity value range of the current depth image frame by using the multi-view image.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

As described above, a depth image may be acquired using an active method and a passive method. When a depth image is acquired using the active method such as a TOF method, a high-quality depth image may not be acquired.

Meanwhile, as described above, the passive method acquires a depth value by using multi-view images. This will be briefly described below. A process of matching baselines between multi-view images is preceded. The process of matching the baselines between the multi-view images is called a horizontal axis rectification. Scan lines between the multi-view images are matched through the horizontal axis rectification.

In the multi-view images in which the scan lines are matched, the least intensity difference value is searched with respect to the same pixels as pixels within the multi-view image from which a depth image is wanted to be acquired, while comparing intensity difference values from those of pixels of other multi-view image. A depth value is obtained by calculating a disparity value using the calculated intensity different value.

However, if the disparity value is calculated by using only the intensity difference value between the pixels on the scan line, an incorrect pixel is selected and an incorrect disparity value and depth value are calculated.

Such an incorrect depth value is corrected using a graph-cut algorithm. The graph-cut algorithm uses an energy minimization function which is composed of disparity values and intensity difference values of the respective pixels. The energy minimization function is a function which can distinguish regions having the same disparity values more exactly by using the disparity values and the intensity difference values. Hence, an incorrect depth value may be corrected to some extent through the graph-cut algorithm. Therefore, a more exact depth value may be obtained if the disparity value and the intensity difference value, which are input values of the energy minimization function, are corrected more exactly.

Exemplary embodiments of the present invention relate to a method and apparatus for enhancing quality of a depth image acquired through an active method or a passive method. The quality of a depth image is enhanced by more exactly setting a disparity value of an existing depth image and an intensity difference value corresponding to the disparity value.

Figure 1:
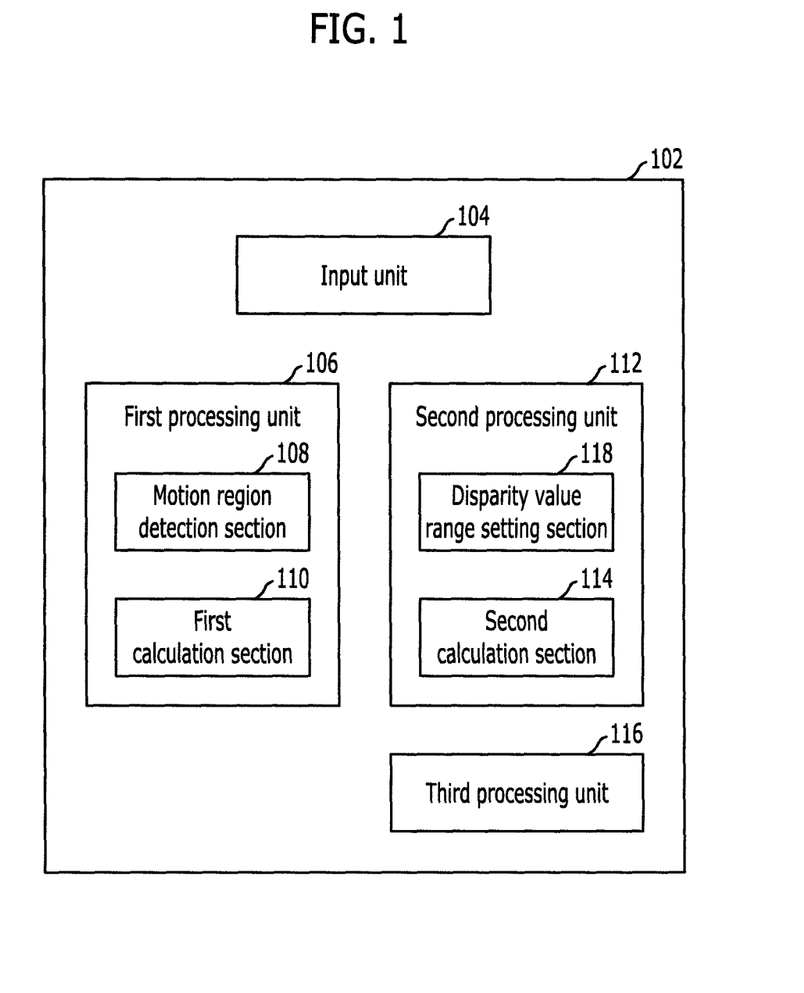
FIG. 1 is a configuration diagram of an apparatus for enhancing quality of a depth image in accordance with an embodiment of the present invention.

FIG. 1 is a configuration diagram of an apparatus for enhancing quality of a depth image in accordance with an embodiment of the present invention.

Referring to FIG. 1, an apparatus 102 for enhancing quality of a depth image includes an input unit 104, a first processing unit 106, a second processing unit 112, and a third processing unit 116.

The input unit 104 receives a variety of images and data necessary for depth image processing. Specifically, the input unit 104 receives a multi-view image, which includes a left image, a right image, and a center image, a current depth image frame, a previous depth image frame of the current depth image frame.

The first processing unit 106 sets an intensity difference value corresponding to a specific disparity value of the current depth image frame by using the current depth image frame and the previous depth image frame inputted through the input unit 104.

The first processing unit 106 includes a motion region detection section 108 and a first calculation section 110. The motion region detection section 108 compares the current depth image frame with the previous depth image frame, and divides the current depth image frame into a motion region and a non-motion region.

The division of the current depth image frame into the motion region and the non-motion region may be achieved using several methods. One of them will be taken as an example. A frame difference between the current depth image frame and the previous depth image frame is calculated. At this time, since a color balance is preprocessed and all cameras are static with respect to the corresponding scene, a moving object can be detected using the frame difference. The calculated frame difference value is greater than an arbitrary threshold value. A mean value of the frame differences within the corresponding frame is used as the threshold value. The threshold value may be calculated using Equation 1 below.

$$th_n = \frac{1}{m \times n} \sum_{i=0}^{m-1} \sum_{j=0}^{n-1} (Y_n(i,j) - Y_{n,-1}(i,j)) \quad \text{Eq. 1}$$

In Equation 1, a reframe resolution is m×n in size, and $Y_n(i,j)$ represents a Y component value of an nth frame in a pixel which is located at an ith width and a jth height.

In order to detect the non-motion region more quickly, the frame may be divided into several blocks (e.g., 16×16). In each block, fewer pixels than the threshold value $th_n$ are the reference of the non-motion region. The non-motion region may be detected using Equation 2 below.

$$B_n(i,j) \in \{i,j | |Y_n(i,j) - Y_{n-1}(i,j)| < th_n\} \quad \text{Eq. 2}$$

When the number of $B_n(i,J)$ pixels of a certain block is less than 10%, the corresponding block is considered as the non-motion region.

The first calculation section 110 converts a depth value of each pixel included in the non-motion region into a disparity value of each pixel. In this case, the first calculation section 110 may acquire a disparity vector of a left camera and a disparity vector of a right camera, and convert a depth value of each pixel into a disparity value by using the acquired disparity vectors.

Then, the first calculation section 110 sets an intensity difference value, which corresponds to the disparity value of each pixel, to a predetermined value, for example, zero. In the case of the non-motion region, the previous depth image frame can be considered as having the exact disparity value and the intensity difference value corresponding to the exact disparity value. Thus, it is unnecessary to newly set a disparity value and an intensity difference value with respect to the non-motion region.

The second processing unit 112 sets a disparity value range including a specific disparity value, and sets an intensity difference value corresponding to a disparity value range of the current depth image frame by using the multi-view image inputted through the input unit 104.

The second processing unit 112 includes a disparity value range setting section 118. The disparity value range setting section 118 sets a disparity value range by setting a maximum disparity value and a minimum disparity value, and sets an intensity difference value with respect to only the disparity value range. The disparity value range setting section 118 may calculate a distance between a left camera and a center camera and a distance between a left camera and the center camera, and determine the maximum disparity value and the minimum disparity value by using the calculated distance between the left camera and the center camera and the calculated distance between the right camera and the center camera.

The second processing unit 112 includes a second calculation section 114. The second calculation section 114 selects a disparity value which is included in the set disparity value range and is unequal to the specific disparity value from the first processing unit 106. The second calculation section 114 calculates a left intensity difference value and a right intensity difference value with respect to the selected disparity value by using the multi-view image inputted through the input unit 104, compares the calculated left intensity difference value with the calculated right intensity difference value, and sets the less value as the intensity difference value corresponding to the selected disparity value.

The third processing unit 116 performs a graph-cut algorithm by using the disparity value, which is included in the disparity value range set by the second processing unit 112, and the intensity difference value corresponding to the disparity value.

Figure 2:
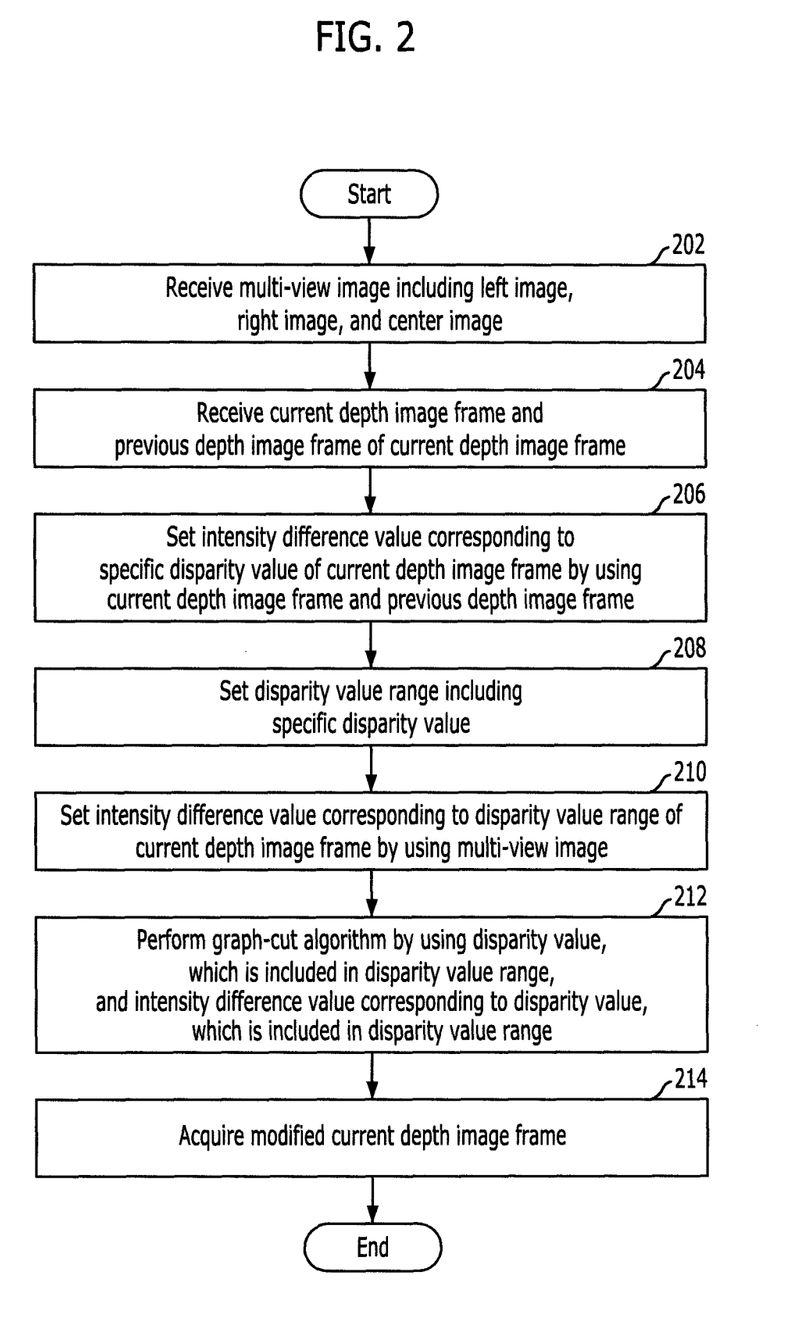
FIG. 2 is a flowchart of a method for enhancing quality of a depth image in accordance with an embodiment of the present invention.

FIG. 2 is a flowchart of a method for enhancing quality of a depth image in accordance with an embodiment of the present invention.

At step 202, a multi-view image which includes a left image, a right image, and a center image is received. At step 204, a current depth image frame and a previous depth image frame of the current depth image frame are received. For example, when the multi-view image and the current depth image frame are an nth frame (where n is an integer), the previous depth image frame is an (n−1)th frame.

Although not illustrated in FIG. 2, a process of determining whether the inputted current depth image frame is a modified depth image or not may be performed after the current depth image frame is received. The modified depth image refers to a depth image in which a problem is corrected, for example, when noise exists in a depth image acquired through an active method or a passive method, or when temporal consistency of the depth image is not maintained. When the inputted depth image frame is the modified depth image, it is unnecessary to modify the corresponding depth image. Therefore, the remaining steps 206 to 212 may not be performed.

At step 206, an intensity difference value corresponding to a specific disparity value of the current depth image frame is set using the current depth image frame and the previous depth image frame. The specific disparity value of the current depth image frame refers to a disparity value of a region which is considered to be motionless when comparing the current depth image frame with the previous depth image frame. When the previous depth image frame is the depth image which is modified by the method according to the embodiment of the present invention or other methods, it is unnecessary to modify the disparity value of the pixel, which is included in the non-motion region of the current depth image frame, and the intensity difference value corresponding to the disparity value. Therefore, the intensity difference value corresponding to the disparity value of the non-motion region is set to a predefined set, for example, zero, and the set intensity difference value is not modified any more. In this manner, the quality of the depth image can be enhanced more efficiently. The step 206 will be described in more detail with reference to FIG. 3.

Figure 3:
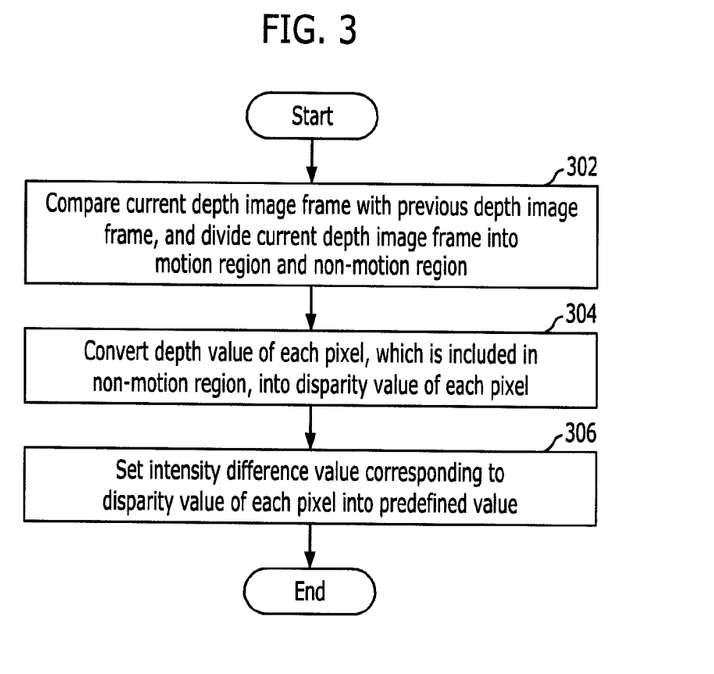
FIG. 3 is a detailed flowchart of step 206 in FIG. 2.

FIG. 3 is a detailed flowchart explaining the step 206 of FIG. 2.

At step 302, the current depth image frame is divided into a motion region and a non-motion region by comparing the current depth image frame and the previous depth image frame. In the case of the motion region, the disparity value and its corresponding intensity difference value are modified through the remaining steps 208 and 210. At step 304, a depth value of each pixel included in the non-motion region is converted into a disparity value of each pixel. Since each pixel within the non-motion region has a depth value, the depth value is converted into the disparity value. When converting the depth value into the disparity value, disparity vectors among parameters of the left camera and the right camera may be used.

Finally, at step 306, the intensity difference value corresponding to the disparity value of each pixel is set to a predefined value, for example, zero. Since the image of the non-motion region maintains the disparity value of the modified previous depth image frame, it may be determined to be exact. Therefore, the intensity difference value of the specific disparity value is set to a predefined value, for example, zero.

Referring again to FIG. 2, the intensity difference value corresponding to the specific disparity value of the current depth image frame is set using the current depth image frame and the previous depth image frame at step 206, and the disparity value range including the specific disparity value is set at step 208. The disparity value range refers to a range of disparity values which will modify the intensity disparity value through step 210. The setting of the disparity value range is achieved by setting a maximum disparity value and a minimum disparity value. As one method of setting the maximum disparity value and the minimum disparity value, the distance between the left camera and the center camera and the distance between the right camera and the center camera are calculated, and the maximum disparity value and the minimum disparity value are determined using the distance calculation result. In some cases, the maximum disparity value and the minimum disparity value may be set to arbitrary values.

After the step 208 of setting the disparity value range, the intensity difference value corresponding to the disparity value range of the current depth image frame is set using the multi-view image at step 210. The step 210 will be described below in more detail with reference to FIG. 4.

Figure 4:
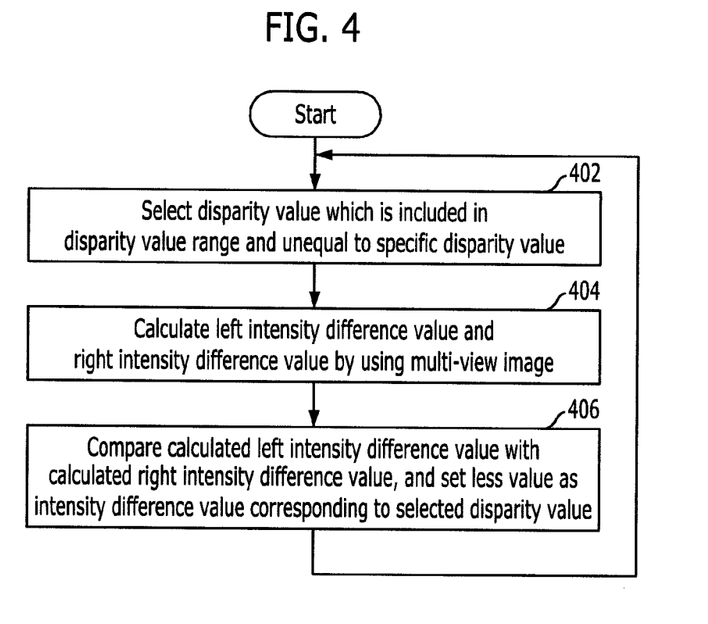
FIG. 4 is a detailed flowchart of step 210 in FIG. 2.

FIG. 4 is a detailed flowchart explaining the step 210 of FIG. 2.

At step 402, a disparity value which is included in the disparity value range and is unequal to the specific disparity value is selected. For example, the first disparity value may be set to the minimum disparity value, and steps 404 and 406 may be performed until the disparity value becomes the maximum disparity value while increasing it by 1. The reason why the disparity value unequal to the specific disparity value is selected is because the intensity difference value corresponding to the specific disparity value has already been set through the step S206. In accordance with another embodiment of the present invention, it may not be determined whether the disparity value to be selected in the step 402 is equal to the specific disparity value.

At step 404, a left intensity difference value and a right intensity difference value with respect to the selected disparity value are calculated using the multi-view image. The left (or right) intensity difference value refers to an intensity difference value which is calculated by comparing the pixel of the center image corresponding to the selected disparity value with the left (or right) image in the range from the minimum disparity value to the maximum disparity value. At step 406, the calculated left intensity difference value is compared with the calculated right intensity difference value, and the less value is determined as the intensity difference value corresponding to the selected disparity value. The steps 402 to 406 may be repeated within the disparity value range set in the step 208.

Referring again to FIG. 2, the intensity difference value corresponding to the disparity value range of the current depth image is set by using the multi-viewpoint image at step 210, and a graph-cut algorithm is performed by using the disparity value included in the disparity value range, and the intensity difference value corresponding to the disparity value included in the disparity value range at step 212. In other words, an energy minimization function is performed by using the intensity difference value newly set at the step 210, and the disparity value of the intensity difference value. In this manner, the modified current depth image frame having the further enhanced quality is obtained at step 214.

Figure 5:
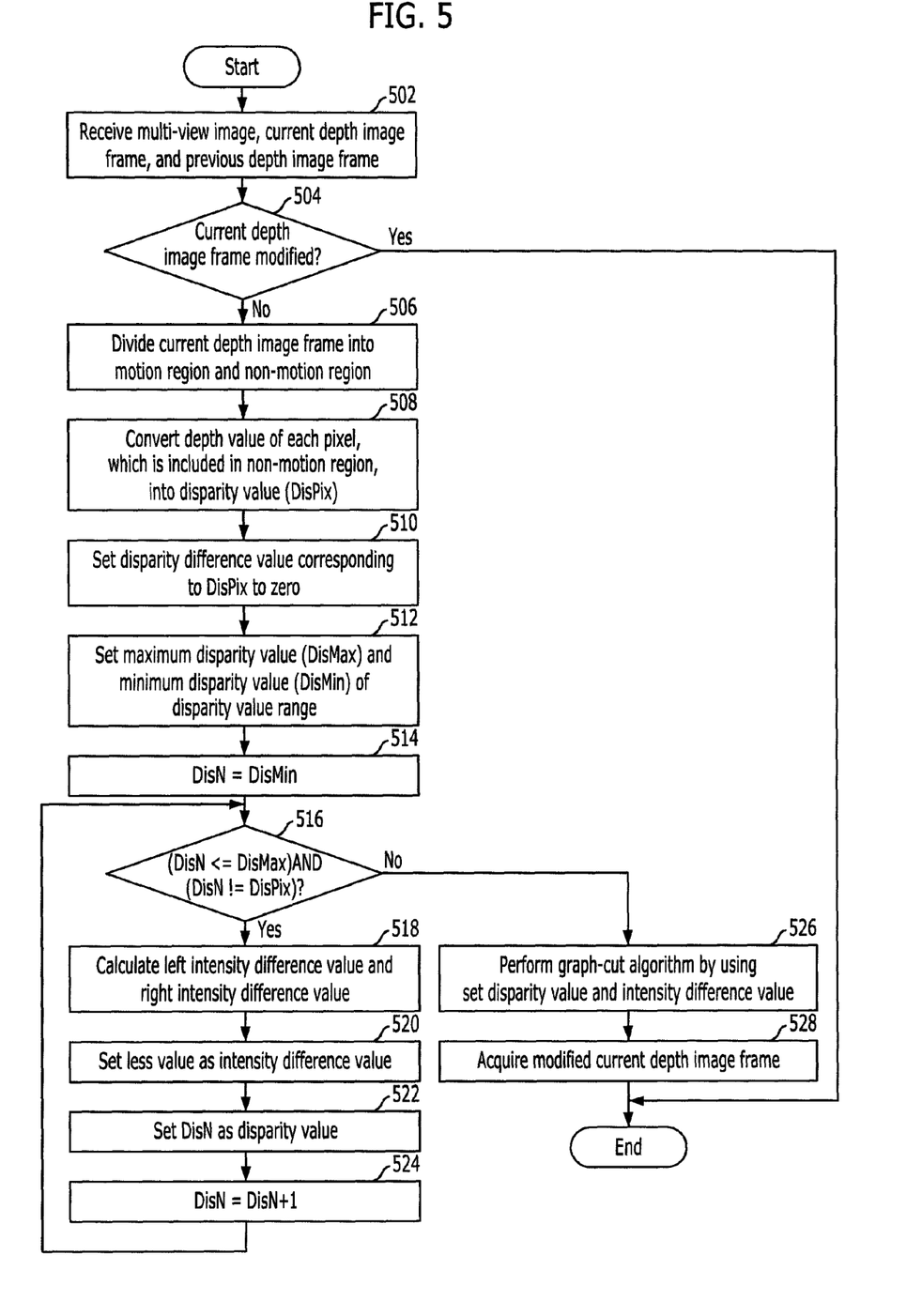
FIG. 5 is a flowchart of a method for enhancing quality of a depth image in accordance with another embodiment of the present invention.

FIG. 5 is a flowchart of a method for enhancing quality of a depth image in accordance with another embodiment of the present invention.

A multi-view image, a current depth image frame, and a previous depth image frame are inputted at step 502. At step 504, it is determined whether the inputted current depth image frame is a modified depth image. When it is determined that the inputted current depth image frame is the modified depth image, the depth image need not be modified any more. The modified depth image refers to a depth image in which a problem is corrected, for example, when noise exists in a depth image acquired through an active method or a passive method, or when temporal consistency of the depth image is not maintained.

When it is determined at the step 504 that the inputted current depth image is not the modified depth image, the current depth image frame is divided into a motion region and a non-motion region at step 506. At the step 506, the current depth image frame may be divided into the motion region and the non-motion region by comparing the current depth image frame with the current depth image frame. Meanwhile, although not illustrated in FIG. 5, it may be determined whether the previous depth image frame is a modified depth image, and steps after the step 506 may be performed only when the previous depth image frame is the modified depth image.

In the motion region of the current depth image frame, a region hidden by other object may newly appear, or a previously existing region may disappear. Therefore, since there is no change in the depth value of the non-motion region, it is unnecessary to enhance the depth values of the motion region.

Thus, the disparity value and its corresponding intensity difference value in the motion region are maintained without variation, and the depth value of each pixel included in the non-motion region is converted into a disparity value (DisPix) at step 508. In the process of converting the depth value into the disparity value, disparity vectors among parameters of the left camera and the right camera may be used. Since pixel values on the scan line between the cameras having the disparity value (DisPix) as the disparity value are equal to one another, the intensity difference value corresponding to the disparity value is set to zero at step 510. The reason is as follows: since the depth value in the non-motion region is not changed when compared with the previous depth image, the depth value of the previous depth can be used as it is, without enhancing the depth value.

After the intensity difference value corresponding to the specific disparity value, that is, the disparity value of the non-motion region, is set to zero through the steps 506 to 510, a disparity value range having a maximum disparity value (DisMax) and a minimum disparity value (DisMin) are set at step 512. The maximum disparity value (DisMax) and the minimum disparity value (DisMin) may be determined from the result which is obtained by calculating the distance between the left camera and the center camera and the distance between the right camera and the center camera, or may be set to an arbitrary value.

At step 514, the DisN is set to DisMin. Then, the following steps are performed until DisMax while increasing DisN by 1. At step 516, it is determined whether DisN is less than or equal to DisMax, and whether DisN is unequal to DisPix. The reason why it is determined at the step 516 whether DisN is unequal to DisPix is because the intensity difference value corresponding to the disparity value, that is, DisPix, has already been set to zero in the non-motion region through the steps 506 to 512, and thus, the intensity difference value need not be newly set any more. However, in accordance with another embodiment of the present invention, only the condition of DisN <=DisMax may be checked at the step 516.

When the corresponding condition is met at the step 516, the left intensity difference value and the right intensity difference value are calculated at step 518.

When the intensity value of the left image, the intensity of the right image, and the intensity value of the center image are defined as Ileft(x±DisN, y), Iright(x±DisN, y), and Icenter(x, y), respectively, the left intensity difference value and the right intensity difference value are calculated using Equations 3 and 4 below, respectively.

Left intensity difference value=$|I_{left}(x\pm DisN,y)-I_{center}(x,y)|$

Right intensity difference value=$|I_{right}(x\pm DisN,y)-I_{center}(x,y)|$

The less value of the calculated left intensity difference value and the calculated right intensity difference value is set as the intensity difference value of the disparity value corresponding to DisN at step 520, and DisN is set as the disparity value at step 522. Then, DisN is increased by 1 at step 524, and the process returns to the step 516.

After the setting of the intensity difference value with respect to the disparity value range is completed, a graph-cut algorithm is performed using the set disparity value and the intensity difference value at step 526. In this manner, the modified current depth image frame having the further enhanced quality can be obtained at step 528.

In accordance with the embodiments of the present invention, the quality of the depth image acquired by the active or passive method can be enhanced by more exactly setting the disparity value and the intensity difference value included in the depth image.

Furthermore, in accordance with the embodiments of the present invention, since the quality of the depth image acquired by the active or passive method is enhanced, noise occurring in the depth image can be removed and the temporal consistency of the depth image can be enhanced.

While the present invention has been described with respect to the specific embodiments, it will be apparent to those skilled in the art that various changes and modifications may be made without departing from the spirit and scope of the invention as defined in the following claims.

What is claimed is:

1. A method for enhancing quality of a depth image, comprising:

receiving a multi-view image including a left image, a right image, and a center image;

receiving a current depth image frame and a previous depth image frame, wherein the current depth frame corresponds to an n-th frame and the previous depth image from corresponds to an (n-1)th frame, where n is an integer;

setting an intensity difference value corresponding to a specific disparity value of the current depth image frame by using the current depth image frame and the previous depth image frame;

setting a disparity value range including the specific disparity value; and setting an intensity difference value corresponding to the disparity value range of the current depth image frame by using the multi-view image.

2. The method of claim 1, wherein said setting an intensity difference value corresponding to the specific disparity value comprises:

comparing the current depth image frame with the previous depth image frame, and dividing the current depth image frame into a motion region and a non-motion region;

converting depth values of pixels, which are included in the non-motion region, into disparity values of the respective pixels; and setting intensity difference values, which correspond to the disparity values of the respective pixels, to a predefined value.

3. The method of claim 2, wherein said converting the depth values of the respective pixels into the disparity values of the respective pixels comprises:

acquiring a disparity vector of a left camera and a disparity vector of a right camera; and converting the depth values of the respective pixels into the disparity values of the respective pixels by using the disparity vector of the left camera and the disparity vector of the right camera.

4. The method of claim 1, wherein said setting an intensity difference value corresponding to the disparity value range comprises:

selecting a disparity value which is included in the disparity value range and is unequal to the specific disparity value;

calculating a left intensity difference value and a right intensity difference value with respect to the selected disparity value by using the multi-view image; and comparing the left intensity difference value with the right intensity difference value, and setting the less value of the left and right difference values as an intensity difference value corresponding to the selected disparity value.

5. The method of claim 1, further comprising performing a graph-cut algorithm by using a disparity value, which is included in the disparity value range, and an intensity difference value corresponding to a disparity value, which is included in the disparity value range.

6. The method of claim 1, wherein said setting the disparity value range comprises setting a maximum disparity value and a minimum disparity value.

7. The method of claim 6, wherein said setting the maximum disparity value and the minimum disparity value comprises:

calculating a distance between a left camera and a center camera and a distance between a right camera and the center camera; and setting the maximum disparity value and the minimum disparity value by using the distance between the left camera and the center camera and the distance between the right camera and the center camera.

8. An apparatus for enhancing quality of a depth image, comprising:

a processor;

an input unit configured to receive a multi-view image, which includes a left image, a right image, and a center image, a current depth image frame, and a previous depth image frame, wherein the current depth frame corresponds to an n-th frame and the previous depth image from corresponds to an (n-1)th frame, where n is an integer;

a first processing unit configured to set, by the processor, an intensity difference value corresponding to a specific disparity value of the current depth image frame by using the current depth image frame and the previous depth image frame; and a second processing unit configured to set a disparity value range including the specific disparity value, and set an intensity difference value corresponding to the disparity value range of the current depth image frame by using the multi-view image.

9. The apparatus of claim 8, wherein the first processing unit comprises:

a motion region detection section configured to compare the current depth image frame with the previous depth image frame, and divide the current depth image frame into a motion region and a non-motion region; and a first calculation section configured to convert depth values of pixels, which are included in the non-motion region, into disparity values of the respective pixels, and set intensity difference values, which correspond to the disparity values of the respective pixels, to a predefined value.

10. The apparatus of claim 9, wherein the first calculation section is configured to acquire a disparity vector of a left camera and a disparity vector of a right camera, and convert the depth values of the respective pixels into the disparity values of the respective pixels by using the disparity vector of the left camera and the disparity vector of the right camera.

11. The apparatus of claim 8, wherein the second calculation section is configured to select a disparity value which is included in the disparity value range and is unequal to the specific disparity value, calculate a left intensity difference value and a right intensity difference value with respect to the selected disparity value by using the multi-view image, compare the left intensity difference value with the right intensity difference value, and set the less value of the left and right difference values as an intensity difference value corresponding to the selected disparity value.

12. The apparatus of claim 8, further comprising a third processing unit configured to perform a graph-cut algorithm by using a disparity value, which is included in the disparity value range, and an intensity difference value corresponding to a disparity value, which is included in the disparity value range.

13. The apparatus of claim 8, wherein the second processing unit further comprises a disparity value range setting section configured to set the disparity value range by setting a maximum disparity value and a minimum disparity value.

14. The apparatus of claim 13, wherein the disparity value range setting section is configured to calculate a distance between a left camera and a center camera and a distance between a right camera and the center camera, and set the maximum disparity value and the minimum disparity value by using the distance between the left camera and the center camera and the distance between the right camera and the center camera.

* * * * *